United States Patent [19]

Miura et al.

[11] Patent Number: 5,625,785
[45] Date of Patent: Apr. 29, 1997

[54] INFORMATION PROCESSING APPARATUS HAVING DUAL BUFFERS FOR TRANSMITTING DEBUG DATA TO AN EXTERNAL DEBUG UNIT

[75] Inventors: Takashi Miura, Yokohama; Katsuhito Fukuoka, Kawasaki, both of Japan

[73] Assignee: Kabushiki Kaisha Toshiba, Kawasaki, Japan

[21] Appl. No.: 371,692

[22] Filed: Jan. 12, 1995

[30] Foreign Application Priority Data

Jan. 13, 1994 [JP] Japan ......................................... 6-1953

[51] Int. Cl.$^6$ ................................................ G06F 9/38
[52] U.S. Cl. ................ 395/568; 364/231.8; 364/243.41; 364/243.42; 395/183.14
[58] Field of Search ........................... 371/16–16.5, 19; 395/575, 375

[56] References Cited

U.S. PATENT DOCUMENTS

| | | | |
|---|---|---|---|
| 3,707,725 | 12/1972 | Dellheim ................................. | 371/19 |
| 4,205,370 | 5/1980 | Hirtle ................................... | 395/575 |
| 4,598,364 | 7/1986 | Gum et al. ............................ | 371/19 |
| 4,601,008 | 7/1986 | Kato ................................... | 395/550 |
| 4,714,994 | 12/1987 | Oklobdzija et al. ................... | 395/375 |
| 5,146,570 | 9/1992 | Hester et al. ......................... | 395/375 |
| 5,265,213 | 11/1993 | Weiser et al. ........................ | 395/375 |
| 5,347,649 | 9/1994 | Alderson .............................. | 395/600 |
| 5,359,608 | 10/1994 | Belz et al. ............................ | 371/16.5 |
| 5,371,689 | 12/1994 | Tatsuma ............................... | 364/569 |
| 5,410,685 | 4/1995 | Banda et al. ......................... | 395/575 |
| 5,463,745 | 10/1995 | Vidwans et al. ..................... | 395/375 |

OTHER PUBLICATIONS

Sohi; Instruction Issue Logic for High–Performance, Interruptible, Multiple Functional Unit, pipelined computers; pp. 349–359.

*Primary Examiner*—Krisna Lim
*Attorney, Agent, or Firm*—Foley & Lardner

[57] ABSTRACT

An information processing apparatus has an instruction execution unit (IEU), a counter, first and second FIFO buffers, and a selector. The IEU executes instructions. The counter traces an order of execution of the instructions executed by the IEU and stores the order of execution as an order data. The first FIFO buffer stores a branch source address data obtained by a branch instruction together with the order data. The second FIFO buffer stores a content of a memory obtained by a memory access instruction or push data obtained by a stack push instruction together with the order data. The selector selects one of the data stored in the first and second FIFO buffers and provides it to an external device. The selector selects the first FIFO buffer prior to the second FIFO buffer as long as the first FIFO buffer has the branch source address data stored therein.

11 Claims, 5 Drawing Sheets

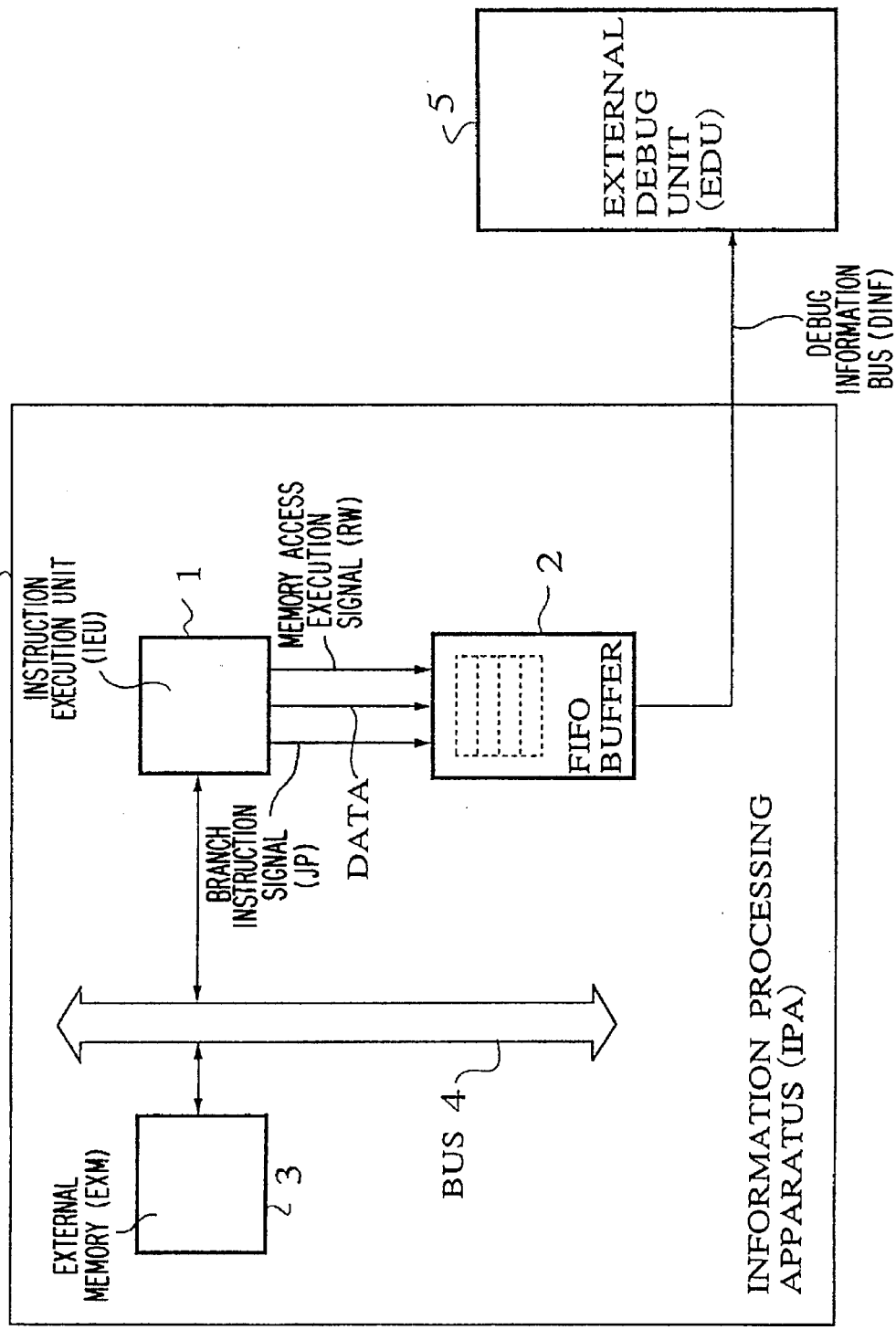

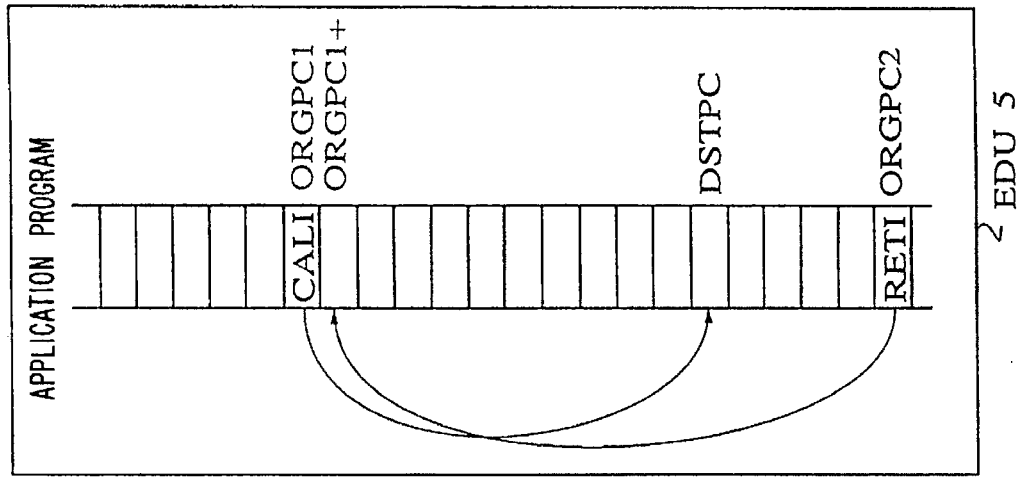
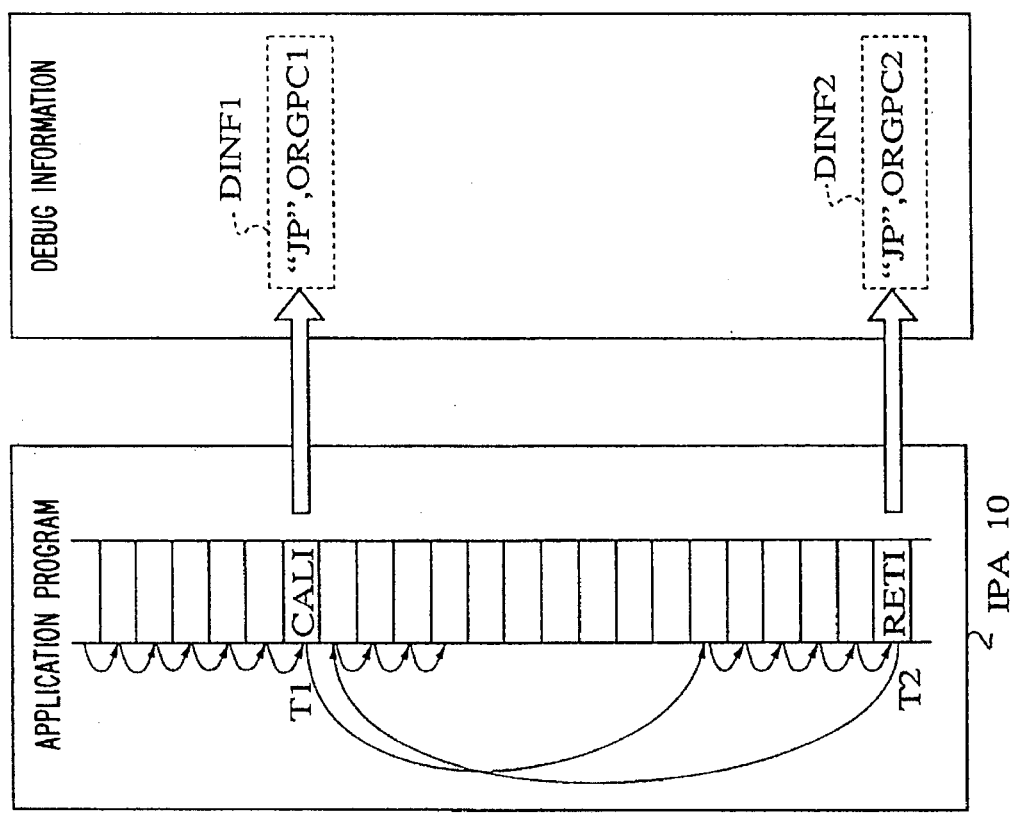

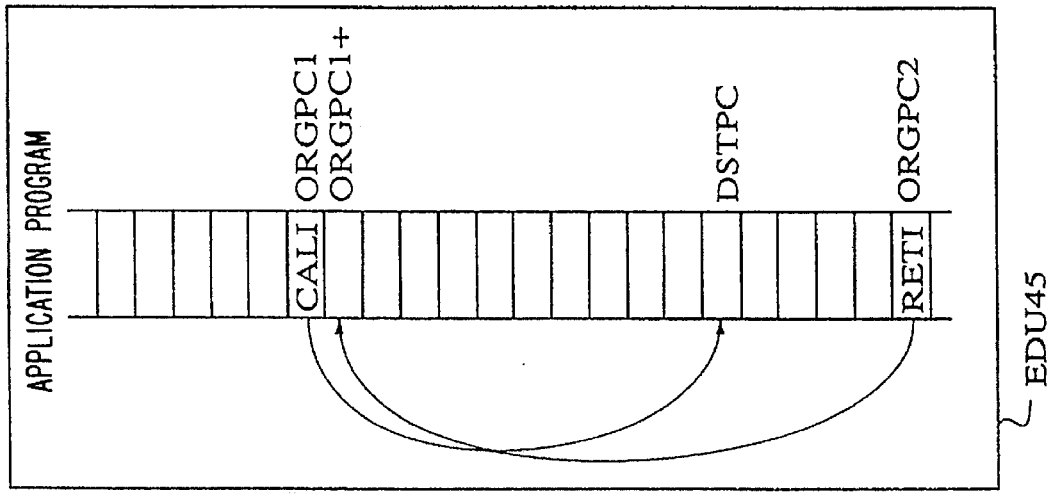
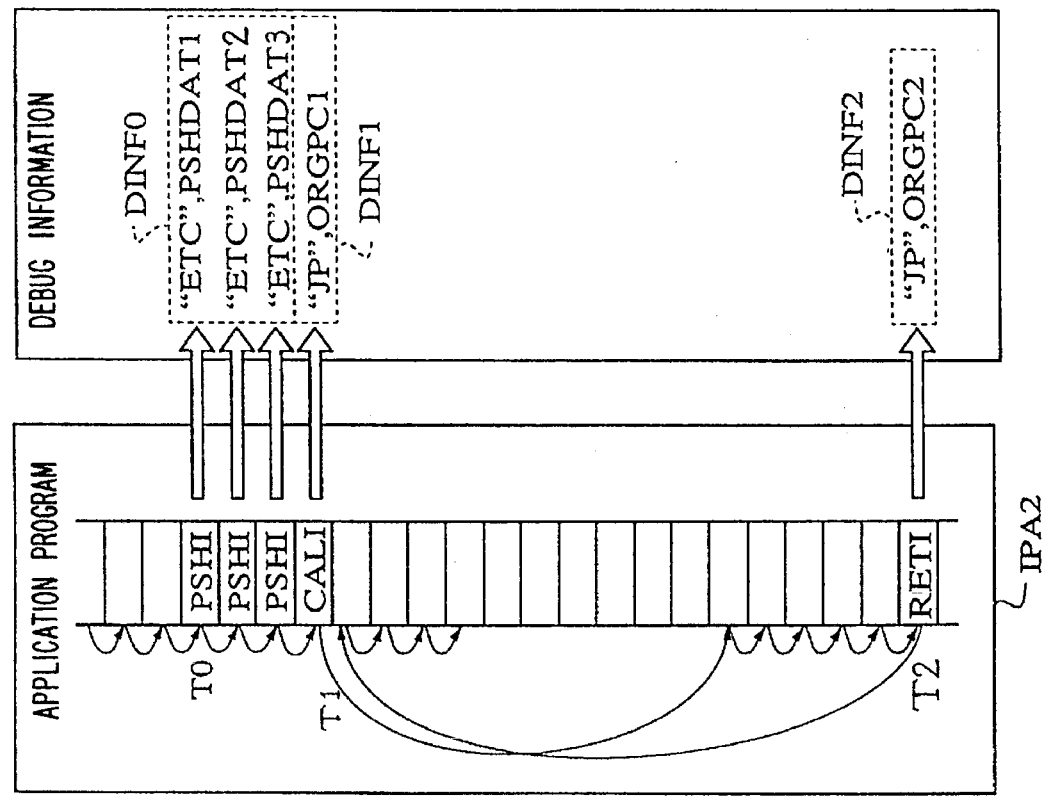

INFORMATION PROCESSING APPARATUS HAVING DUAL BUFFERS FOR TRANSMITTING DEBUG DATA TO AN EXTERNAL DEBUG UNIT

BACKGROUND OF THE INVENTION

1. Field of the Invention

The present invention relates to an information processing apparatus (or a data processing device) having an internal debug support mechanism or debug support function. In particular, the present invention relates to an information processing apparatus (or a data processing device) which can provide debug information for a branch instruction and data related to a memory access instruction or to a stack push instruction to an external device such as an external debug unit and the like. Further, the information processing apparatus of the present invention can efficiently provide information for debugging. In particular, a higher priority level is given to a branch instruction executed by an instruction execution device in the information processing apparatus so that it can be transmitted to an external debug unit without increasing the buffer size of a debugging FIFO (First in First Out) buffer. Moreover, the information processing apparatus of the present invention is capable of judging what kind of instruction or data is overflowed from a FIFO buffer for debugging.

2. Description of the Prior Art

When a programmer develops an application program executed on a conventional information processing apparatus, it is very important for the programmer to know trace data of operations performed by the information processing apparatus in a debugging stage.

So, it is very important to transmit the trace data of execution performed by the information processing apparatus as debug data and to transmit and store the trace delta to and in an external debug device for debugging.

It would be ideal to store trace data items for all operations performed by the information processing apparatus in the external debug device. However, this is not practical because the number of the trace data items of all operations performed by the information processing apparatus are too large. In order to overcome the problem in the conventional information processing apparatus described above, only the data related to a branch instruction executed by the information processing apparatus is transmitted to an external debug device and stored as a branch data. By getting this branch data, a programmer can trace the execution or operation flow of the information processing apparatus for debugging.

FIG. 1 is a configuration diagram of a conventional information processing apparatus 10. The conventional information processing apparatus 10 comprises only one FIFO (First in First Out) buffer 2 for storing debug data transmitted from an instruction execution unit 1. The FIFO buffer (FB) 2 comprises four buffers representing four stages. When the four buffers in the. FIFO buffer 2 are filled with debug data items, the data transmitted from the instruction execution unit 1 cannot be stored in the FIFO buffer 1.

Under this condition, we will now explain how the debug data is transmitted from the FIFO buffer 2 to an external debug unit (EDU) 5.

When a branch instruction execution signal JP or a memory access execution signal RW changes from an inactive state (Low level, for example) to an active state (High level, for example), debug data on a debug information output bus DATA is stored in one of the buffers in the FB 2. At the same time, the debug data is stored with a code indicating whether the debug data is for a branch instruction or a memory access instruction.

Next, the debug data stored in the FIFO buffer 2 is transmitted to the external debug unit 5.

The debug data which is read out first from the FIFO buffer 2 is the debug data which is the oldest debug data.

The external debug unit (EDU) 5 knows an internal state of the information processing apparatus 10 during debugging operation by interpolating debug data items such as a branch source address and memory access data related to a branch instruction and a memory access (read/write) data from the external memory 3 transmitted through a debug information bus (DINF).

In the debugging operation for an application program (APRG) by the external debug unit 5, the instruction execution trace data is one of the important data for debugging. In other words, a programmer can find bugs in an application program by observing an active state of the application program by using the instruction execution trace data.

If the external debug unit (EDU) 5 can get an application program (APRG) stored in the external memory 3 and this application program is not changed, a programmer can analyze bugs in the application program by tracing back execution of branch instructions. Therefore, the most important information or data for debugging is information about where a branch instruction has been executed in the application program (APRG).

We will now explain the debug operation for a conventional information processing apparatus which transmits only a branch source address related to a branch instruction and the problem caused by the conventional information processing apparatus.

Next, we are explaining concretely how the execution trace or operation trace of the information processing apparatus (IPA) 10 can be known debug data related to branch operations with reference to FIGS. 2A to 2C.

FIG. 2A shows an execution flow of the information processing apparatus 10 executing the application program APRG. In FIG. 2A, solid lines with arrows indicate the execution flow.

At time T1, when the information processing apparatus 10 executes a subroutine call instruction CALI which is a branch instruction, the information processing apparatus 10 transmits a first debug data DINF1 including a branch source address ORGPC1 to the external debug unit 5 through a DINF line.

Next, at time T2, when the information processing apparatus 10 executes a subroutine return instruction RETI which is also a branch instruction, the information processing apparatus 10 transmits a second debug data DINF2 including a branch source address ORGPC2 to the external debug unit 5 through the DINF line. FIG. 2B shows the first and second debug data items DINF1 and DINF2.

The external debug unit (EDU) 5 for debugging connected to the information processing apparatus 10 receives the debug data items DINF1 and DINF2, and analyzes them based on a debugging software. We will explain the debugging operation for the debugging data items DINF1 and DINF2 with reference to FIG. 2C.

At first, as clearly shown in FIG. 2C, it can be observed that the branch instruction CALI is executed at the branch address ORGPC1 after the information processing apparatus 10 has executed instructions until the branch source address ORGPC1. In this case, the instruction indicated by the branch source address ORGPC1 in the application program APRG is a subroutine call instruction CALL. Therefore it can be understood that the branch instruction is a subroutine call instruction at the branch address ORGPC1. A target address of this branch operation is known by decoding the subroutine call instruction CALL. In the specification, the target address of the branch operation will be referred to as a branch target address DSTPC.

Following the above operation, by analyzing the second debug data DINF2, the information processing apparatus 10 executes instructions between the branch target address DSTPC and the branch source address ORGPC2 in order. Further, the information processing apparatus 10 executes again a branch instruction at the branch source address ORGPC2.

The content of the branch source address ORGPC2 in the application program, in this case, is a subroutine return instruction RETI.

In general, when the subroutine return instruction RETI indicated by the address ORGPC2 is executed, the operation flow returns to an address which is immediately following the subroutine call instruction indicated by the address ORGPC1. Therefore, the branch target address of the subroutine return instruction RETI is an address next to the branch source address ORGPC1 in which subroutine call instruction is stored. This target address is referred to as a branch source address ORGPC1+.

Thus, when the information processing apparatus 10 transmits the debug data items DINF such as DINF1, DINF2 to the external debug unit 5, the external debug unit 5 analyzes these debug data items and reconstructs the operation trace of the information processing apparatus 10 by using the debug data items and the application program APRG based on the debug program.

Although the external debut unit 5 can analyze operation trace of the conventional information processing apparatus 10 by the debugging method described above, it cannot observe information related to data used in execution of the application program APRG. In this case, there is not enough debug data for debugging. This is a problem.

In order to overcome the above problem caused by the conventional information apparatus, another debug operation is performed by a conventional information processing apparatus. In this case, the conventional information processing apparatus generates and transmits not only a branch source address about a branch instruction, but also data related by a memory access instruction such as read-out/ write-in instructions to an external debug unit. In this conventional information processing apparatus, the instruction execution unit 1 transmits debug data items such as the branch source address about he branch instruction and the data about the memory access instruction to the FIFO buffer 2 by activating a branch instruction execution signal JP and a memory access execution signal RW, as shown in FIG. 1.

However, all debug data items are stored without checking the priority degree or the priority level of each of the debug data items for debugging in the conventional information processing apparatus 10. In the configuration of the information processing apparatus shown in FIG. 1, debug data related to an important branch instruction is overflowed.

For example, we assume a case where the four buffers in the FIFO buffer 2 are empty. In this case, at first, a first branch instruction is executed by the information processing apparatus 10, and then four memory access instructions accessing the external memory 3 are executed in order. At the time when the fourth memory access instruction is executed, if the external debug unit 5 does not read out the contents in two buffers in the FIFO buffer 2, there is no empty buffer in the FIFO buffer 2. In this case, when a second branch instruction is executed, the branch information relating to this second branch instruction is overflowed. The branch source address about the second branch instruction is a very important debug data for debugging. Therefore the debugging operation cannot be carried out. This is a problem.

As described above in detail, in the conventional information processing apparatus has following two problems (1) and (2).

(1) In the first conventional case, there is no debug data related to memory access instructions in an application program executed by the conventional information apparatus. Information for debugging is not enough.

(2) In the conventional second case, all of debug data items related to a branch instruction and a memory access instruction are stored without checking a priority level of each of the instructions executed by the conventional information processing apparatus. In this case, debug data about a branch instruction which is the most important debug data is often overflowed from a FIFO buffer.

SUMMARY OF THE INVENTION

Accordingly, an object of the present invention is, with due consideration to the drawbacks of such conventional information processing apparatus, to provide an information processing apparatus which can generate debug data related to a branch instruction and a memory access instruction without overflow and which can transmit the debug data to an external debug unit.

Further, another object of the present invention, is to provide an information process apparatus that can generate and transmit to an external debug unit an execution address or a branch source address related to a branch instruction having the highest priority level without increasing a FIFO buffer size. In addition, another object of the present invention is to provide an information processing apparatus that can provide debug data whereby an external debug unit can analyze and detect a debug data which is overflowed from a FIFO buffer and is not transmitted to the external debug unit.

The present invention provides an information processing apparatus according to the preferred embodiments of the present invention.

As one preferred embodiment of the present invention, an information processing apparatus comprises:

instruction execution means for executing instructions in an application program;

count means for counting an order of execution of the instructions executed by the instruction execution means and storing this order as order data;

a plurality of buffer means connected to the instruction execution means and the counter means for storing debug data relating to the instruction executed by the instruction execution means with the order data relating to this instruction, each of the plurality of buffer means storing the debug data relating to different kinds of the instructions, respectively; and selection means for selecting one of the debug data items stored in the plurality of buffer means and providing it to external device, wherein the selection means selects a specific buffer means in the plurality of buffer means plurality of buffer means prior to the other buffer means so long as the specific buffer means stores the debug data.

In the information processing apparatus described above, the number of the plurality of buffer means is two, a first buffer and a second buffer, the first buffer is the specific buffer means, the first buffer receives and stores only a branch source address as the debug data with the order data relating to a branch instruction in the instructions executed by the instruction execution means.

In the information processing apparatus described above, the second buffer receives and stores only access data as the debug data with order data, accessed by a memory access instruction in the instructions executed by the instruction execution means.

In the information processing apparatus described above, the second buffer receives only push data pushed by a stack push instruction in the instructions executed by the instruction execution means with the order data.

In the information processing apparatus described above, each of the plurality of buffer means comprises a First In First Out (FIFO) buffer.

As another preferred embodiment of the present invention, an information processing apparatus comprises:

memory means comprising an application program section used for storing an application program, a stack section used for a stack push instruction, and a data section storing a plurality of data items used for a memory access instruction;

instruction execution means for executing instructions in the application program, the instruction execution means transmitting an activated branch instruction execution signal being an activated state and a branch source address relating to execution of the branch instruction only when the instruction execution means executes a branch instruction, and the instruction execution means transmitting an activated memory access signal being the active state and a content of a memory addressed by the memory access instruction only when the instruction execution means executes the memory access instruction;

counter means for incrementing the counter means itself and transmitting a content of the counter means as an order data only when the counter means receives the activated branch instruction execution signal, and the activated memory access signal transmitted from the instruction execution means;

a plurality of First In First Out (FIFO) buffer means comprising: a branch instruction address FIFO buffer and a memory data FIFO buffer, the branch instruction address FIFO buffer storing the branch source address data transmitted from the instruction execution means with the order data from the counter means only when the branch instruction address FIFO buffer receives the activated branch instruction execution signal, and the memory data FIFO buffer storing the content of the memory addressed by the memory access instruction transmitted from the instruction execution means with the order data from the counter means only when the memory data FIFO buffer receives the activated memory access execution signal; and selection means connected to the plurality of FIFO buffer means for selecting one of the plurality of FIFO buffer means and transmitting a content of the selected plurality of FIFO buffer means, wherein the selection means selects the branch instruction address FIFO buffer prior to the memory data FIFO buffer so long as the branch instruction address FIFO buffer stores the branch source address data.

As another preferred embodiment of the present invention, an information processing apparatus comprises:

memory means comprising an application program section used for storing an application program, a stack section used for a stack push instruction, and a data section storing a plurality of data items used for a memory access instruction;

instruction execution means for executing instructions in the application program, the instruction execution means transmitting an activated branch instruction execution signal being an active state and a branch source address relating to execution of the branch instruction only when the instruction execution means executes the branch instruction, and the instruction execution means transmitting an activated stack push signal being the active state and a push data in the memory means pushed by the stack push instruction only when the instruction execution means executes the stack push instruction;

counter means for incrementing the counter means itself and transmitting a content of the counter means as an order data only when the counter means receives the activated branch instruction execution signal, and the activated stack push signal transmitted from the instruction execution means;

a plurality of First In First Out (FIFO) buffer means comprising: a branch instruction address FIFO buffer, and a push data FIFO buffer, the branch instruction address FIFO buffer storing the branch source address data transmitted from the instruction execution means with the order data from the counter means only when the branch instruction FIFO buffer receives the activated branch instruction execution signal, and the push data FIFO buffer storing the push data in the stack section transmitted from the instruction execution means with the order data from the counter means only when the push data FIFO buffer receives the activated stack push execution signal; and selection means connected to the plurality of FIFO buffer means for selecting one of the plurality of FIFO buffer means and transmitting a content of the selected plurality of FIFO buffer means, wherein the selection means selects the branch instruction FIFO buffer means prior to the push data FIFO buffer so long as the branch instruction address FIFO buffer stores the branch source address data.

BRIEF DESCRIPTION OF THE DRAWINGS

These and other objects, features, and advantages of the present invention will become more apparent from the following description of the preferred embodiments taken in conjunction with the accompanying drawings, in which:

FIG. 1 is a configuration diagram of a conventional information processing apparatus and the relationship between the information processing apparatus and an external debug unit.

FIGS. 2A, 2B and 2C are operation flow diagrams of debugging executed by the conventional information processing apparatus and the external debug unit shown in FIG. 1.

FIGS. 5A, 5B and 5C are operation flow diagrams of debugging executed by the information processing apparatus and the external debug unit shown in FIG. 4.

DETAILED DESCRIPTION OF THE PREFERRED EMBODIMENTS

Other features of this invention will become apparent in the course of the following description of exemplary embodiments which are given for illustration of the invention and are not intended as limitations thereof.

Information processing apparatus and external debug units of the first and second embodiments of the present invention will now be explained with reference to the drawings FIGS. 3 and 5.

Basic Idea of the Present Invention

In an information processing apparatus of the present invention, a branch source address related to a branch instruction executed by an instruction execution unit is stored into a first buffer (branch instruction address FIFO buffer) and access data related to a memory access instruction or push instruction is stored into a second buffer (memory data FIFO buffer or push data FIFO buffer). In other words, the branch source address and the access data are stored into different buffers. In addition, each of the debug data items for debugging such as the branch source address and the access data is stored with an instruction execution occurrence sequence data indicating the order of instructions executed by the instruction execution unit. Thus, branch source addresses related to branch instructions can be stored with certainty into the first buffer.

An external debug unit receives the debug data and analyzes them in order to know the execution trace of the information process apparatus.

If the first FIFO buffers are filled with debug data, (in other words, as long as there is debug data in the first FIFO buffer) the information processing apparatus transmits the contents of the first buffer, namely the branch source addresses, to the external debug unit prior to the transmission of the access data stored in the second buffer. Accordingly, the external debug unit can get the most important debug data prior to the data about the memory access instruction stored in the second FIFO buffer.

In addition, if data relating to a branch instruction is overflowed from the first FIFO buffer, and a branch source address about a next branch instruction is stored, the external debug unit can detect the overflowed branch instruction by using the instruction execution occurrence sequence data.
First embodiment FIG. 3 is a configuration diagram of an information processing apparatus according to a first embodiment of the present invention.

Figure 3:
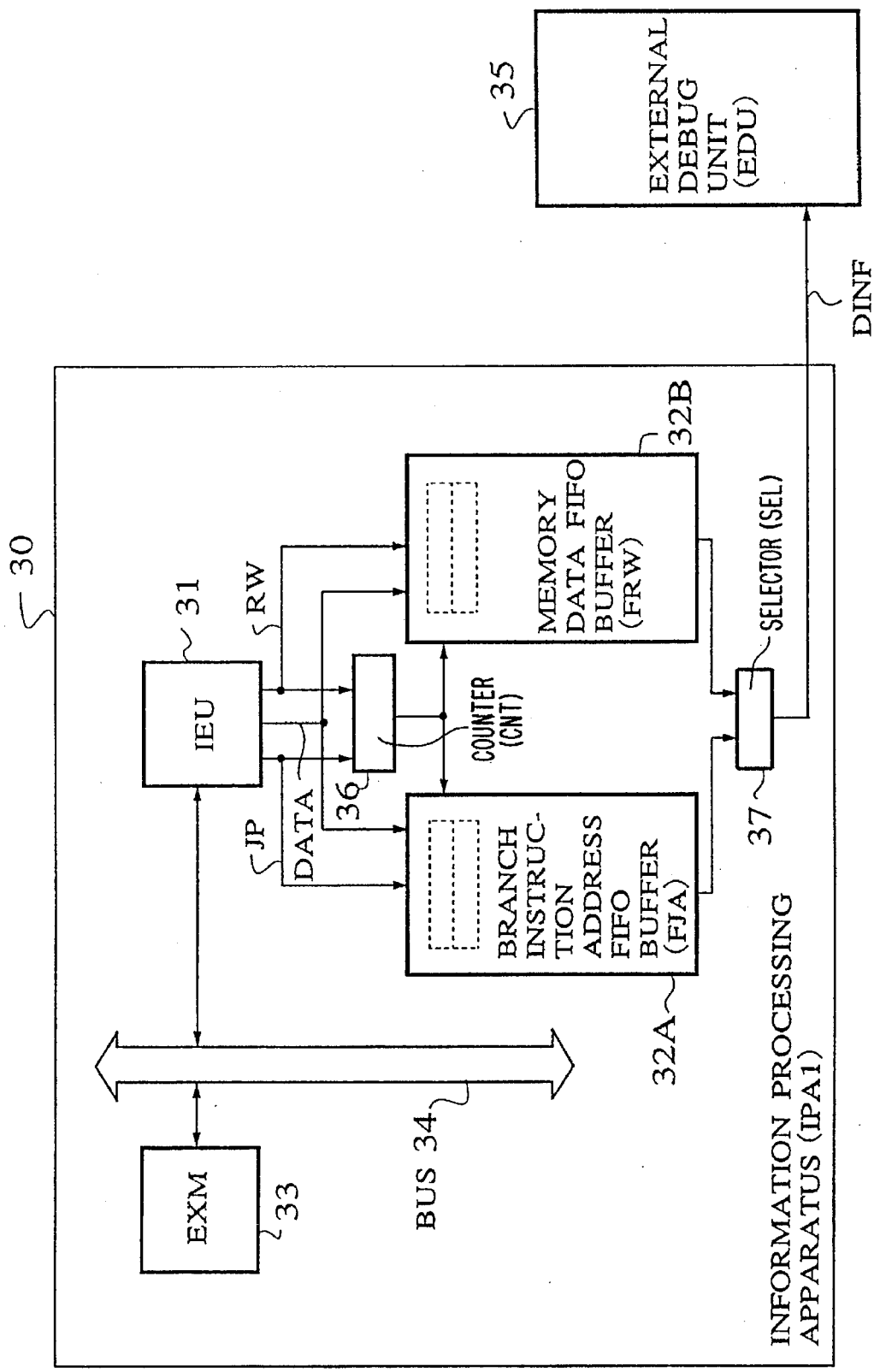
FIG. 3 is a configuration diagram of an information processing apparatus and the relationship between the information processing apparatus and an external debug unit according to a first embodiment of the present invention.

In FIG. 3, the information processing apparatus of the first embodiment comprises an instruction execution unit (IEU) 31, a counter 36, a branch instruction address FIFO buffer (FJA) 32A, a memory data FIFO buffer (FRW) 32B, and a selector 37.

The instruction execution unit (IEU) 31 reads out an instruction of an application program stored in an external memory (EXM) 33 connected to the IEU 31 through a bus (BUS) 34 and executes this instruction.

The counter (CNT) 36 counts or increments the content of the counter 36 only when either a branch instruction execution signal JP or a memory access execution signal RW from the IEU 31 is changed from an inactive state to an active state. The IEU transmits these signals only when the IEU 31 executes a branch instruction and a memory access instruction.

The selector 37 selects either the contents in the branch address FIFO buffer 32A or the contents of the memory data FIFO buffer 32B and transmits them to the external debug unit 35 through a line DINF. The selector 37 transmits the content of the branch instruction address FIFO buffer (FJA) 32A prior to the contents of the memory data FIFO buffer (FRW) 32B as long as there is data in the branch instruction address FIFO buffer (FJA) 32A.

The instruction execution device (IEU) 31 transmits the activated branch instruction execution signal JP to the FJA 32A and the counter 36 only when a branch instruction is executed during an application program execution operation. At this time, the IEU 31 transmits a branch source address to the FIFO buffer (FRW) 32A through the debug data output bus DATA.

When a memory access instruction is executed, the IEU 31 transmits the activated memory access execution signal RW to the memory data FIFO buffer (FRW) 32B and the counter 36. At this time, the IEU 31 transmits the content of the external memory (EXM) 33, indicated by the memory access instruction, to the FIFO buffer (FRW) 32B through the debug data output bus DATA.

The counter 36 receives either the activated branch instruction execution signal JP or the activated memory access execution signal RW and increments the content of the counter. In other words, the content or value of the counter 36 indicates a sequence of the branch instruction and the memory access instruction executed and transmitted by the IEU 31.

The sequence of occurrence of a branch instruction is called a branch instruction occurrence sequential data, and the sequence of occurrence of a memory access instruction is called a memory access instruction occurrence sequential data.

The branch instruction address FIFO buffer 32A stores both a content of the counter 36 and a branch source address transmitted through the debug data output bus DATA when the FIFO buffer (FJA) 32A receives the activated branch execution signal JP transmitted from the IEU 31.

The memory data FIFO buffer 32B stores both a content of the counter 36 and a content of the memory transmitted through the debug data output bus DATA when the FIFO buffer (FRW) 32B receives the activated memory access execution signal RW transmitted from the IEU 31.

Specifically, only the branch source address transmitted from the IEU 31 through the debug data output bus DATA and the branch instruction occurrence sequential data from the counter 36 are stored in the branch instruction address FIFO buffer (FJA) 32A. On the other hand, only the memory access data related to the memory access instruction transmitted from the IEU 31 through the debug information output bus DATA and the memory access instruction occurrence sequential data from the counter 36 are stored in the memory data FIFO buffer (FRW) 32B.

The selector 37 is connected to both the branch instruction address FIFO buffer (FJA) 32A and the memory data FIFO buffer (FRW) 32B. The debug data is stored in either the FJA 32A of the FRW 32B, and the selector 37 selects the debug data stored in either the FJA 32a of the FRW 32B and transmits the selected one to the external debug unit 35.

When debug data is stored in both the FJA 32A and the FRW 32B, the debug data stored in the FJA 32A is read out prior to that stored in 32B and transmitted to the external debug unit 35. Each of the Branch instruction address FIFO buffer (FJA) 32A and the memory data FIFO bugger (FRW) 32B comprises two buffers as shown by dotted lines in FIG. 3.

Here, we are considering the conventional problem of the conventional information processing apparatus shown in FIG. 1, where a branch source address represented as debug data related to a branch instruction information is overflowed from the buffer, which is described in the PRIOR ART section of this specification.

At first, a branch source address of a first occurring branch instruction is stored in the branch instruction address FIFO buffer (FJA) 32A. Although debug data items about third and fourth memory access instructions in the four memory access instructions following the first branch instruction are not stored in the memory data FIFO buffer (FRW) 32B, the branch instruction executed after the four memory access instructions can be stored in the branch instruction address FIFO buffer (FJA) 32A.

At this time, the debug data items, namely two branch source addresses stored in the FJA 32A, are read out to the external debug unit 35 through the DINF line, because the debug data items stored in the FJA 32A is the FRW 32B. Accordingly, the debug data related to the two branch instructions are transmitted to the external debug unit 35 continuously. In this case, the value of the counter 36 related to the two branch instructions are transmitted to the external debug unit 35 continuously. In this case, the value of the counter 36 related to the two branch instructions are discontinuous in order. By these discontinuous counter values, the: external debug unit (EDU) 35 can detect to read out the debug data items related to the two branch instructions from the FJA 32A prior to the debug data items stored in the FRW 32B. In addition, by checking the value of the counter 36, the external debug unit 35 can know which instruction is not stored in the FIFO buffers 32A and 32B.

As described above in detail, the information processing apparatus 30 according to the first embodiment of the present invention can provide more debug data items related to branch instructions, relative to the conventional information processing apparatus, without increasing the FIFO buffer size. In addition, by using the information processing apparatus according the first embodiment of the present invention, debug data items which are overflowed from the FIFO buffers can be detected correctly.

Second Embodiment

Figure 4:
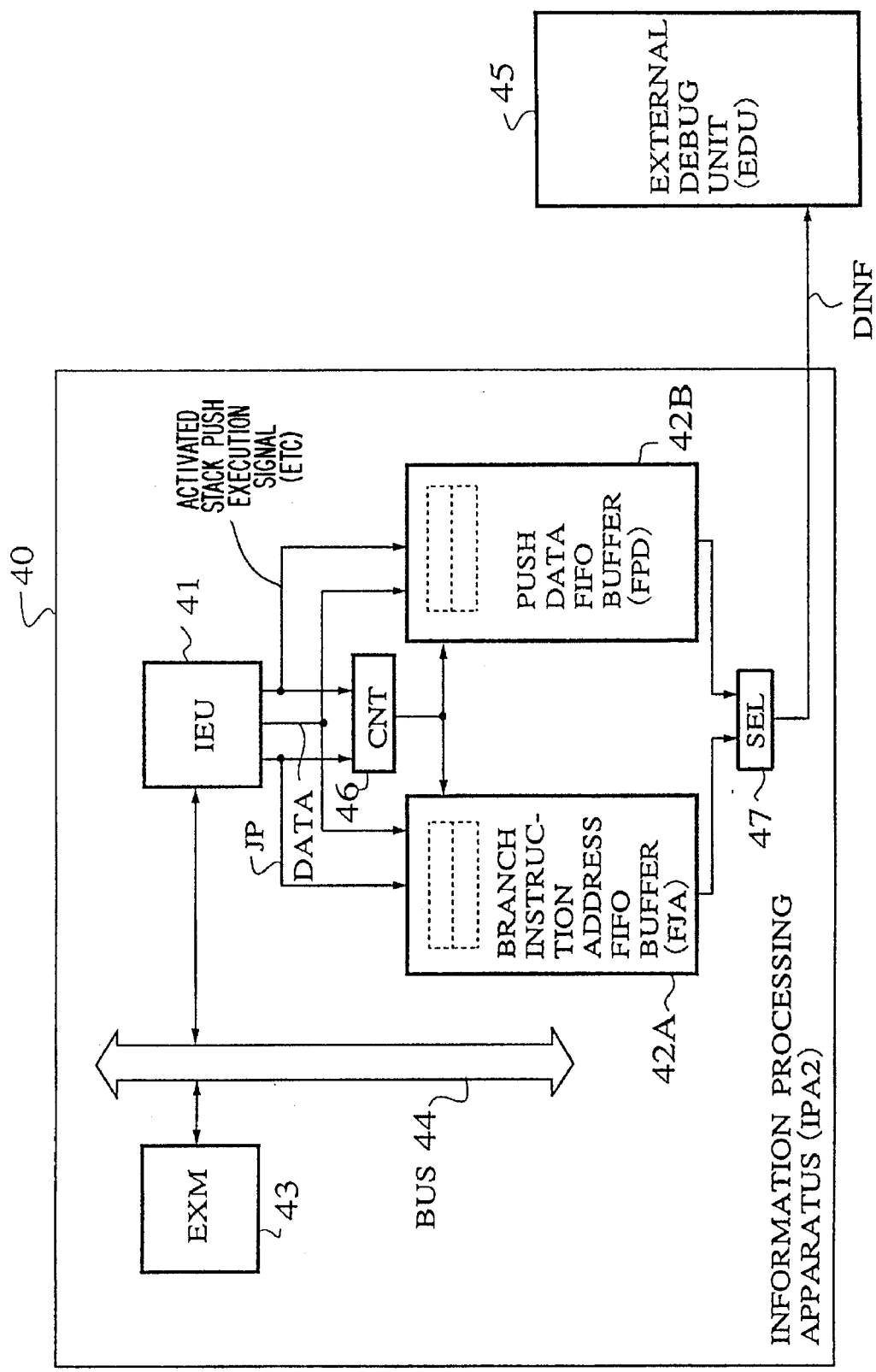
FIG. 4 is a configuration diagram of an information processing apparatus and the relationship between the information processing apparatus and an external debug unit according to a second embodiment of the present invent ion.

FIG. 4 is a configuration diagram of an information processing apparatus 40 according to a second embodiment of the present invention the information processing apparatus 40 of the second embodiment is basically the same as that of the first embodiment shown in FIG. 3.

The information processing apparatus of the second embodiment comprises an instruction execution unit (IEU) 41, a counter 46, a branch instruction address FIFO buffer (FJA) 42A, a push data FIFO buffer (FPD) 42B, and a selector 47.

The instruction execution unit (IEU) 41 reads out an instruction of an application program stored in an external memory (EXM) 43 connected to the IEU 41 through a bus (BUS) 44 and executes the instruction.

The counter (CNT) 46 counts or increments the content of the counter 46 only when either branch instruction execution signal JP or a stack push execution signal ETC is changed from an inactive state to an active state.

The selector 47 selects either the contents in the branch instruction address FIFO buffer 42A or the contents of the push data FIFO buffer 42B and transmits it to the external debug unit 45 through a DINF line.

The instruction execution device (IEU) 41 transmits the activated branch instruction execution signal JP to the branch instruction address FIFO buffer (FJA) 42A and the counter 46 only when a stack push instruction is executed during a program execution operation. Than, the IEU 41 transmits a branch source address relating to the branch instruction to the FJA 42A through the debug data output bus DTA.

In addition, the IEU 41 transmits the activated stack push execution signal ETC to the push data FIFO buffer (FPD) 42B and the counter 46 only 35 when a stack push instruction is executed during a program execution operation, and then the IEU 41 transmits pushed data related to the stack push instruction to the FPD 42B through the debug data output bus DATA.

When the counter 46 receives either the activated branch instruction execution signal HP or the activated stack push execution signal ETC, the counter 46 increments the content of the counter. In other word, the content or value of the counter 46 indicates a sequence of occurrence of the branch instruction (referred to as a branch instruction occurrence sequential data) and the stack push instruction (referred to as a stack push instruction occurrence sequential data).

The branch instruction address FIFO buffer (FJA) 42A stores both a content of the counter (CNT) 46 and a branch source address related to a branch instruction transmitted from the IEU 41 through the debug data output bus DATA when the FIFO buffer (FJA) 42A receives the activated branch execution signal JP transmitted from the IEU 41.

The push data FIFO buffer (FPD) 42B stores both a content of the counter 46 and pushed data related to a stack push instruction transmitted from the IEU 41 through the debug data output bus DATA when the FIFO buffer (FPD) 42B receives the activated push data access execution signal ETC transmitted from the IEU 41.

Specifically, the branch instruction address FIFO buffer (FJA) 42A stores only the branch instruction occurrence sequential data and the branch source address on the debug data output bus DATA. On the other hand, only both the pushed data related to the stack push instruction transmitted through the debug data output bus DATA and the instruction occurrence sequential data for this stack push instruction are stored in the push data FIFO buffer (FPD) 42B.

The selector 47 is connected to both the branch instruction address FIFO buffer (FJA) 42A and the push data FIFO buffer (FPD) 42B. The selector 47 selects either the debug data in the FJA 42A or the FPD 42B, and transmits the selected one to the external debug unit (EDU) 45 through the DINF line.

The FJA 42A and the FPD 42B are filled with debug data such as branch source address data and memory data, and the like.

When both of the FJA 42A and the FPD 42B are filled with debug data, the debug data stored as a branch source address data is read out to the external debug unit 45 prior to the debug data stored in the FPD 42B is read out. Each of the branch instruction address FIFO buffer (FJA) 42A and the push data FIFO buffer (FPD) 42B of the information processing apparatus according to the second embodiment comprises two buffers, as shown by dotted lines in FIG. 4.

Next, we will describe debug operation in the information processing apparatus 40 according to the second embodiments of the present invention with reference to FIG. 5. The debug operation for the information processing apparatus 30 according to the first embodiment is basically the same as that for the second embodiment. Therefore the explanation of the debug operation flow for the information processing apparatus 30 is omitted from this specification.

FIG. 5A shows an operation flow when the information processing apparatus (IPA2) 40 executes an application program APRG. In FIG. 5A, solid lines with arrows indicate the execution flow of the program APRG executed by the instruction execution unit 41.

At time T0 in FIG. 5A, when the IEU 41 of the information processing apparatus (IPA2) 40 executes a stack push instruction PSHI, the information processing apparatus 40 transmits debug data items including pushed data PSHDAT1 to the external debug unit 45 through the push data FIFO buffer (FPD) 42B and the selector 47. Following this operation, the information processing apparatus 40 transmits debug data including pushed data PSHDAT2, PSHDAT3 related to execution of stack push instructions immediately following the stack push instruction PSHI. These debug data items related to the three stack push instructions are called the 0th debug data.

The debug operation at time T1 and T2 after time T0 is equal to the debug operation shown in FIG. 2A. As a result, the information processing apparatus 40 transmits the debug data items according to the three stack push instructions to the FPD 42B, and transmits debug data relating to the two branch instructions to the FJA 42A. These debug data items DINF (the 0th, first, second debug data items DINF0, DINF1, DINF2) are transmitted to the external debug unit 45 through the DINF line, as shown in FIG. 5B.

The external debug unit (EDU) 45 connected to the information processing apparatus 40 receives the debug data items DINF and analyzes them by using the application program APRG and a debug software program.

We will describe the analysis operation of the debug data items DINF with reference to FIG. 5C.

At first, the external debug unit 45 analyzes the 0th debug data DINF0 which is transmitted through the DINF line, so that the external debug unit 45 knows that data items related to the pushed data items PSHDAT3, PSHDAT2, PSHDAT1 are stacked in order in a stack memory.

Next, by using the first debug information DINF1, the external debug unit 45 knows that the information processing apparatus (IPA2) 40 has executed instructions until the branch source address ORGPC1, and has then performed a branch instruction at the branch source address ORGPC1. At this time, since the instruction in the application program APRG addressed by the branch source address ORGPC1 is a subroutine call instruction CALL, the target address can be known by decoding the subroutine call instruction. This target address obtained by decoding is called the branch source address DSTPC.

Next, The external debug unit 45 refers to a source program of the application program APRG to detect the number of parameters of the subroutine addressed by the branch source address DSTPC. In this case, the number of the references of the subroutine is three. The three data items, PSHDAT3, PSHDAT2, PSHDAT1 are stacked in order in the stack memory. Therefore, it is detected that the parameters of this subroutine are PSHDAT3, PSHDAT2, and PSHDAT1.

Following this debug operation, by using the second debug data DINF2, the external debug unit 45 detects that the information processing apparatus has executed the instructions addressed from the branch source address DSTPC to the branch source address ORGPC2, and has then performed the branch operation on the branch source address.

The external debug unit 45 knows that the instruction in the application program addressed by the branch source address ORGPC2 is the subroutine return instruction RETI.

The operation flow is returned back to the instruction immediately following the subroutine call instruction by executing the subroutine return instruction. We call the address of the instruction immediately following the subroutine call instruction as the branch source address ORGPC1+.

Thus, when the information processing apparatus (IPA2) transmits debug data (or debug information) about branch instructions, the external debug unit connected to the information processing apparatus can reproduce and analyze the operational trace of the information processing apparatus by using the application program and the debug data based on the execution of a debugging software installed in the external debug unit.

In addition, by this, the external debug unit can know the contents of parameters related to a subroutine call instruction.

As described above in detail, because the information processing apparatus can transmit not only an execution trace, but also the detailed debug data including parameters of a subroutine call instruction to an external debug unit, the external debug unit can analyze the detailed debug data items.

While the above provides a full and complete disclosure of the preferred embodiments of the present invention, various modifications, alternate constructions and equivalents may be employed without departing from the true spirit and scope of the invention. Therefore the above description and illustration should not be construed as limiting the scope of the invention, which is defined by the appended claims.

What is claimed is:

1. An information processing apparatus comprising:

memory means including an application program section for storing an application program, a stack section for storing a stack push instruction, and a data section for storing a plurality of data items used for a memory access instruction;

instruction execution means for executing instructions in the application program, the instruction execution means transmitting an activated branch instruction execution signal and a branch source address data related to an execution of a branch instruction when the instruction execution means executes the branch instruction, and the instruction execution means transmitting an activated memory access signal and a content of a memory accessed by the memory access instruction when the instruction execution means executes the memory access instruction;

counter means for tracing an order of instructions executed by said instruction execution means and for transmitting a content of the counter means as an order data when the counter means receives the activated branch instruction execution signal and the activated memory access signal transmitted from the instruction execution means;

a plurality of First In First Out (FIFO) buffer means including a branch instruction address FIFO buffer and a memory data FIFO buffer, the branch instruction address FIFO buffer storing the branch source address data transmitted from the instruction execution means together with the order data from the counter means when the branch instruction address FIFO buffer receives the activated branch instruction execution signal, and the memory data FIFO buffer storing the content of the memory accessed by the memory access instruction transmitted from the instruction execution means together with the order data from the counter means when the memory data FIFO buffer receives the activated memory access execution signal; and selection means connected to the plurality of FIFO buffer means for selecting one of the plurality of FIFO buffer means and transmitting a content of the selected one of the plurality of FIFO buffer means, wherein the selection means selects the branch instruction address FIFO buffer prior to the memory data FIFO buffer as long as the branch instruction address FIFO buffer has the branch source address data stored therein.

2. An information processing apparatus comprising:

memory means including an application program section for storing an application program, a stack section for storing a stack push instruction, and a data section for storing a plurality of data items used for a memory access instruction;

instruction execution means for executing instructions in the application program, the instruction execution means transmitting an activated branch instruction execution signal and a branch source address related to an execution of a branch instruction when the instruction execution means executes the branch instruction, and the instruction execution means transmitting an activated stack push signal and a push data accessed by the stack push instruction when the instruction execution means executes the stack push instruction;

counter means for for tracing an order of instructions executed by said instruction execution means and for transmitting a content of the counter means as an order data when the counter means receives the activated branch instruction execution signal and the activated stack push signal transmitted from the instruction execution means;

a plurality of First In First Out (FIFO) buffer means including a branch instruction address FIFO buffer, and a push data FIFO buffer, the branch instruction address FIFO buffer storing the branch source address data transmitted from the instruction execution means together with the order data from the counter means when the branch instruction FIFO buffer receives the activated branch instruction execution signal, and the push data FIFO buffer storing the push data accessed by the stack push instruction transmitted from the instruction execution means together with the order data from the counter means when the push data FIFO buffer receives the activated stack push execution signal; and selection means connected to the plurality of FIFO buffer means for selecting one of the plurality of FIFO buffer means and transmitting a content of the selected one of the plurality of FIFO buffer means, wherein the selection means selects the branch instruction FIFO buffer means prior to the push data FIFO buffer as long as the branch instruction address FIFO buffer has the branch source address stored therein.

3. An information processing apparatus comprising:

instruction execution means for executing instructions of an application program;

counter means for tracing an order of execution of the instructions executed by the instruction execution means and storing said order as an order data;

a plurality of buffer means connected to the instruction execution means and the counter means for storing debug data related to the instructions executed by the instruction execution means together with the order data related to said instructions, each of the plurality of buffer means storing debug data related to instructions of different types;

selection means for selecting one of the debug data stored in the plurality of buffer means; and output means for outputting the debug data selected by said selection means to an external debugging device, wherein the selection means selects a specified one of the plurality of buffer means prior to selecting other ones of buffer means so long as the specified buffer means contains the debug data.

4. An information processing apparatus as claimed in claim 3, wherein the plurality of buffer means consists of a first buffer and a second buffer, and the first buffer is the specified buffer means and receives and stores a branch source address as the debug data together with order data related to a branch instruction executed by the instruction execution means.

5. An information processing apparatus as claimed in claim 4, wherein the second buffer receives and stores access data as the debug data together with order data related to a memory access instruction executed by the instruction execution means.

6. An information processing apparatus as claimed in claim 4, wherein the second buffer receives push data together with order data related to a stack push instruction executed by the instruction execution means.

7. An information processing apparatus as claimed in claim 3, wherein each of the plurality of buffer means is a First In First Out (FIFO) buffer.

8. An information processing apparatus comprising:

an instruction execution unit for executing instructions in sequence;

a memory connected to said instruction execution unit for storing the instructions in a program format;

a counter connected to said instruction execution unit through a first signal line indicative of an execution of a branch instruction and a second signal line indicative of an execution of a memory access instruction for incrementing a number and outputting the number indicative of the sequential order of an executed one of a branch instruction and a memory access instruction when the respective one of the branch instruction and the memory access instruction is being executed;

a first buffer connected to said instruction execution unit through said first and second signal lines and a third signal line, said first buffer receiving an address of said branch instruction through said third signal line when the branch instruction is executed by said instruction execution unit;

a second buffer connected to said instruction execution unit through said first and second signal lines and said third signal line, said second buffer receiving and storing a data item read out by said memory access instruction through said third signal line when the memory access instruction is executed by said instruction execution unit; and output means for outputting a content of one of said first buffer and said second buffer to an external debugging device.

9. The information processing apparatus as claimed in claim 8 further comprising a selector connected to said first and second buffers for preferentially outputting a content of said first buffer and outputting a content of said second buffer only when said first buffer is empty.

10. An information processing apparatus comprising:

an instruction execution unit for executing instructions in sequence;

a memory connected to said instruction execution unit for storing the instructions in a program format;

a counter connected to said instruction execution unit through a first signal line indicative of an execution of a branch instruction and a second signal line indicative of an execution of a stack pop or push instruction for incrementing a number and outputting the number indicative of the sequential order of an executed one of a branch instruction and a stack push instruction when the respective one of the branch instruction and the stack push instruction is being executed;

a first buffer connected to said instruction execution unit through said first and second signal lines and a third signal line, said first buffer receiving an address of said branch instruction through said third signal line when the branch instruction is executed by said instruction execution unit;

a second buffer connected to said instruction execution unit through said first and second signal lines and the third signal line, said second buffer receiving and storing a data item read out by said stack push instruction through said third signal line when the stack push instruction is executed by said instruction unit; and output means for outputting a content of one of said first buffer and said second buffer to an external debugging device.

11. The information processing apparatus as claimed in claim 10 further comprising a selector connected to said first and second buffers for preferentially outputting a content of said first buffer and outputting a content of said second buffer only when said first buffer is empty.

* * * * *